Jan. 19, 1937.  A. R. WURTELE  2,068,585

INTERNAL COMBUSTION ENGINE

Filed Dec. 24, 1931  2 Sheets-Sheet 1

Inventor
ALLAN R. WURTELE
By Paul, Paul & Moore
ATTORNEYS

Jan. 19, 1937.  A. R. WURTELE  2,068,585
INTERNAL COMBUSTION ENGINE
Filed Dec. 24, 1931  2 Sheets-Sheet 2

Inventor
ALLAN R. WURTELE
By Paul, Paul & Moore
ATTORNEYS

Patented Jan. 19, 1937

2,068,585

UNITED STATES PATENT OFFICE 2,068,585

INTERNAL COMBUSTION ENGINE

Allan R. Wurtele, New Roads, La.

Application December 24, 1931, Serial No. 582,988

13 Claims. (Cl. 123—32)

This invention relates to new and useful improvements in internal combustion engines, and more particularly to valve mechanisms of the general character disclosed in my co-pending application, Serial No. 571,490, filed October 28, 1931.

In the operation of two-cycle high compression internal combustion engines, of the so-called Diesel type, certain difficulties have heretofore been encountered which tend to limit their usefulness. These difficulties may be summed up briefly as follows: (1) scavenging, that is, removing the burnt gases from the power cylinder and replenishing the latter with a pure air charge; (2) turbulence of the air charge and getting the fuel to the air; and (3) if a valve is used, the difficulty of operating said valve, when the engine is running at high speed, because of the limited time allowed for operating the valve. The purpose of the present invention is to eliminate, as far as possible, all the above-mentioned difficulties.

The scavenging problem is solved by utilizing what is known as "straight through scavenging", that is, letting the scavenging or blast air, which may be supplied from any suitable source at a pressure of about two pounds, in through tangential ports provided in the lower portion of the cylinder wall, which are opened when the piston reaches the lower portion of its stroke, and exhausting said air from the cylinder through a poppet valve provided in the cylinder head, whereby scavenging is accomplished in the most perfect manner, as is probably best exemplified by the results obtained by the opposed piston two-cycle Diesel-engine of the Junkers type.

Turbulence of the air charge is obtained by the swirling action of the scavenging air entering the cylinder from the tangential ports provided in the wall thereof, and which ports are covered and uncovered by the power piston. The fuel is uniformly distributed to the air charge in the cylinder by means of suitable ducts provided in the head of the exhaust valve, which so direct the fuel as to cause it to reach the major portion of the air charge uniformly, while at the same time avoiding direct impingement of the fuel against the piston head or other surfaces, which might lead to serious maintenance difficulties. An enlarged chamber is provided in the valve head which may serve as a precombustion chamber, and is provided with a plurality of ducts, whereby it may also be utilized as a means for uniformly distributing the fuel oil in the cylinder so that the fuel will reach all the available air charge as quickly as possible. The feature of utilizing the head of the exhaust valve as a means for distributing the fuel to the air enables the fuel to reach out further into the air charge than it would otherwise do, as it is a well-known fact that the injection and penetration of the fuel into the dense air in the cylinder, just prior to combustion, is a difficult problem, because of the short time allowed for such operation.

In a two-cycle engine, the exhaust valve is usually only open during 70° of crank travel, whereas in a four-cycle engine, the exhaust valve is usually open during about 180° of crank travel. This brings in the difficulty of getting smooth, quiet, and wearless valve action at high speeds, due to the abruptness of the cam surface necessary in order to open and close the exhaust valve in the small arc of 70°. To improve this condition, a lost motion device may be utilized in connection with the valve operating mechanism, whereby the arc of travel of the crank shaft, during the opening and closing of the valve, may be increased from 70° to approximately 150°.

An important object of the invention is to provide an improved exhaust valve for an internal combustion engine, having means therein for supplying a suitable fuel to the combustion chamber and uniformly distributing it in the air charge therein, wherein a highly combustible fuel mixture is provided, and said valve having means for actuating it which allows ample time for the valve to open and close, thereby assuring proper scavenging of the combustion chamber, with a resultant increase in the efficiency of the engine.

The primary object of the invention, therefore, is to provide an improved internal combustion engine.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
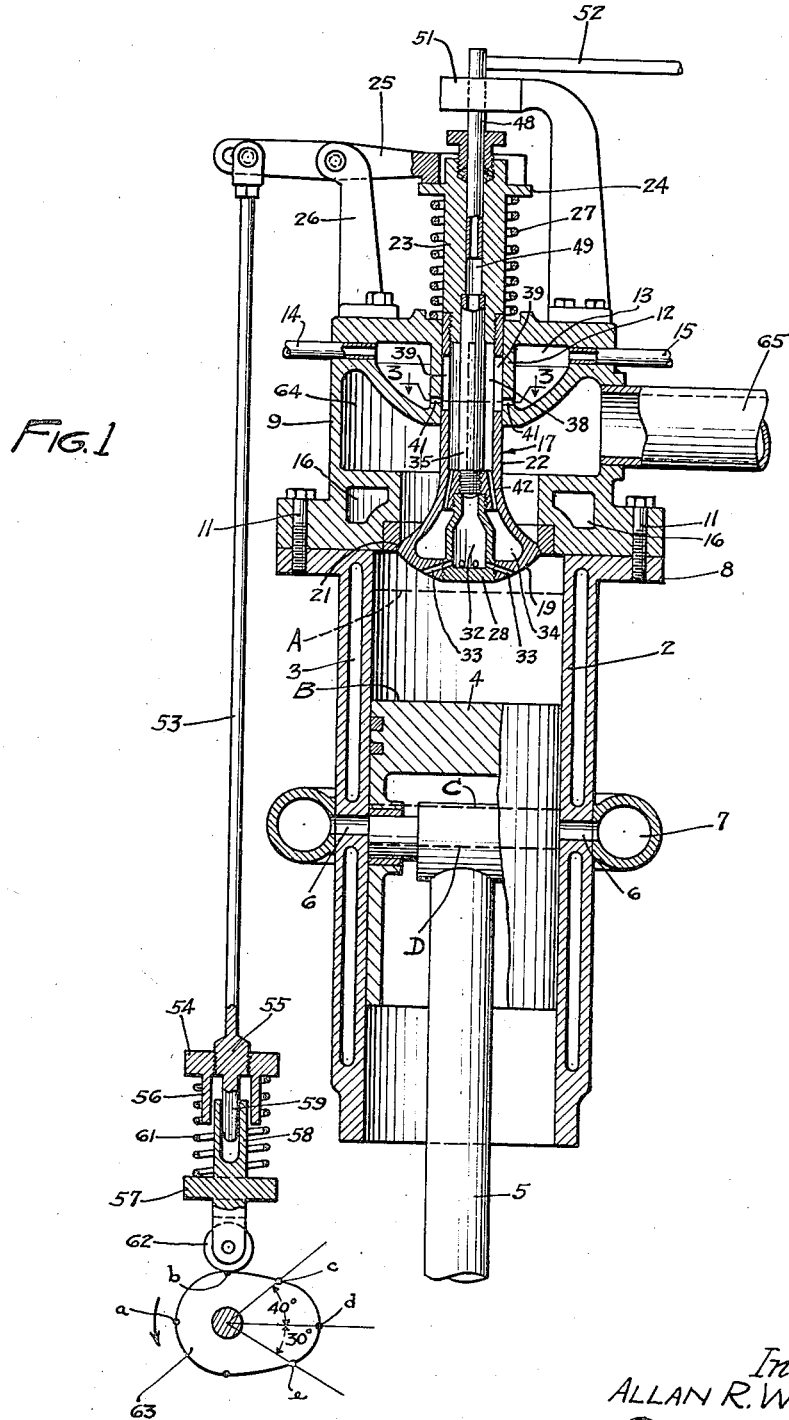
Figure 1 is a vertical sectional view showing a portion of an internal combustion engine with the invention embodied in the construction thereof.

In the selected embodiment of the invention herein disclosed, there is illustrated in Figure 1, for purposes of disclosure, a portion of an internal combustion engine comprising a cylinder 2 shown provided with the usual water jacket 3. A piston 4 is mounted within the cylinder and has a connecting rod 5, the lower end of which is adapted to be connected to the usual engine crank shaft, not shown. A series of tangential scavenging ports 6 are shown provided in the cylinder wall and communicate with an air manifold 7 which may be connected to a suitable source of air supply such, for example, as the crank case or a suitable blower or compressor. The means for supplying the scavenging air to the cylinder forms no part of the present invention and it is therefore thought unnecessary to show the same in the drawings.

The cylinder is shown provided at its upper end with a flange 8 to which a cylinder head 9 is secured by suitable bolts 11. A valve guide 12 is shown provided at the central portion of the cylinder head and may be surrounded by a water circulating passage 13 having suitable connections 14 and 15 whereby water may be circulated therethrough. Suitable water circulating passages 16 are also provided in the lower portion of the cylinder head which are connected in the water circulating system of the engine in the usual manner.

An important feature of this invention resides in the construction of the exhaust valve 17, which comprises a tubular stem 18 slidably mounted in the guide 12 and is provided at its lower end with an enlarged head 19 adapted to engage a valve seat 21, here shown removably secured to the cylinder head. If desired, the valve seat may be integrally formed with the cylinder head.

The exhaust valve is here shown comprising a plurality of parts suitably secured together to provide substantially an integral structure. The lower intermediate portion 22 of the valve stem is shown integrally formed with the head 19 and is internally threaded at its upper end, as indicated at 18 in Figure 2, to secure one end of an upper valve stem section 23 which is secured thereto. The upper valve stem section 23 is provided adjacent to its upper end with an annular flange 24 adapted to be engaged by one end of a rocker arm 25 pivotally supported upon a bracket 26 secured to the cylinder head. A suitable compression spring 27 constantly urges the valve in an upward direction to hold the valve head in engagement with the seat 21.

Figure 2:
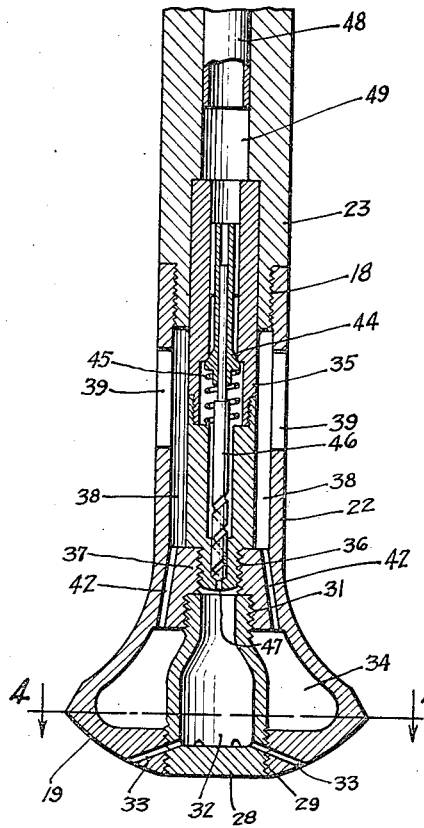
Figure 2 is an enlarged detail sectional view showing the general construction of the exhaust valve and its stem.
Figure 3:
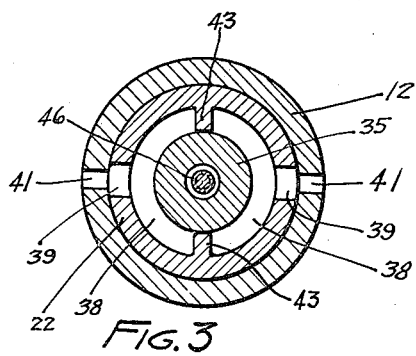
Figure 3 is an enlarged cross-sectional view on the line 3—3 of Figure 1.
Figure 4:
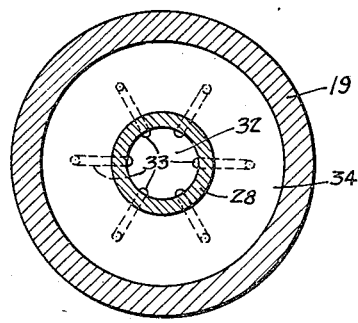
Figure 4 is a detail sectional view on the line 4—4 of Figure 2.

As best shown in Figure 2, the head 19 of the exhaust valve is hollow and is convexed or rounded at its lower end. A member 28 is secured in the head by suitable threads 29 and 31 whereby it is retained therein in fixed relation. The member 28 has a chamber 32 therein which communicates with the combustion chamber or upper end of the power cylinder 2 by means of a plurality of radial ports 33. An annular water circulating chamber 34 is provided around the member 28, as best shown in Figure 2.

A suitable fuel supply nozzle 35 is secured to the lower end of the upper valve stem section 23 and extends into the bore provided in the lower section 22, as best shown in Figure 2. The lower end of the fuel supply nozzle 35 is shown provided with a reduced threaded portion 36 received in threaded engagement with a partition 37 provided in the valve section 22, and to which the upper end of the member 28 is also secured. The fuel supply nozzle is relatively smaller in diameter than the bore of the tubular valve section 22 so as to provide water circulating passages 38 between the walls of the valve stem section 22 and the fuel supply nozzle 35. Suitable openings 39 are shown provided in the wall of the section 22 which communicate with openings 41 provided in the valve stem guide 12, whereby water circulation is established between the chamber 13 and the water circulating passages 38 within the valve stem. Suitable water circulating passages 42 are provided in the partition 37 whereby the water may circulate from the passages 38 into the water circulating chamber 34 provided in the valve head.

To cause the water to circulate through the valve head, suitable vertically disposed baffles or walls 43 are provided in the space between the nozzle and the walls of the bore in the valve stem section 22 which cause the water entering the chamber 38 at the left hand side of Figure 2, to flow downwardly through the passages 42, through the water circulating chamber 34 of the head, and thence upwardly through the passages 42 at the opposite side of the stem and through the openings 39 and 41 of the valve stem and guide, respectively, into the water circulating chamber 13 of the cylinder head at the other side of the valve stem.

The fuel supply nozzle is here shown comprising a check valve 44 mounted therein which is retained in its seat by a suitable spring 45. The check valve has a depending stem 46 having its lower end fitting in a bore provided in the lower end of the fuel supply nozzle. An orifice 47 establishes communication between the precombustion chamber 32 and the interior of the fuel supply nozzle, as best shown in Figure 2.

Fuel is supplied to the nozzle 35 from a supply pipe 48 snugly fitting in a bore 49 provided in the upper section 23 of the valve stem. The upper end of the fuel supply pipe 48 may be supported in a suitable bracket 51 secured to the cylinder head. A pipe 52 is connected with the fuel supply pipe 48 and leads to a suitable source of fuel supply, not shown.

A means for operating the exhaust valve is shown in Figure 1, and comprises a valve rod 53 having its upper end pivotally connected with the rocker arm 25 and its lower end provided with a lost motion device comprising a member 54 secured to the lower enlarged end portion 55 of the valve stem, and having a depending cylindrical flange 56. A member 57 is operatively connected with the member 54 of the valve stem by means of a tubular extension 58 having a bore adapted to receive the depending end portion 59 of the valve stem. A suitable compression spring 61 is interposed between the members 54 and 57 and constantly tends to urge these members apart. The lower member 57 carries a cam roller 62 adapted to ride on the periphery of a cam 63 which preferably is operatively connected with the usual crank shaft of the engine by suitable means, not shown. The depending end portion 59 of the valve stem and also the bore provided in the extension 58 of the member 57, are preferably of rectangular cross section so as to prevent relative rotation of the member 57 with respect to the valve stem.

In the drawings, I have shown the cam provided with a single actuating surface in which case it must be operated at crank shaft speed. If desired, two diametrically disposed actuating surfaces may be provided upon the cam 63 and the cam may then be rotated at one-half the speed of the engine crank shaft. By reducing the speed of the cam shaft to one-half that of the crank shaft, the peripheral speed of the cams will be reduced with a resultant reduction in wear and possible noise.

*Operation*

Figure 5:
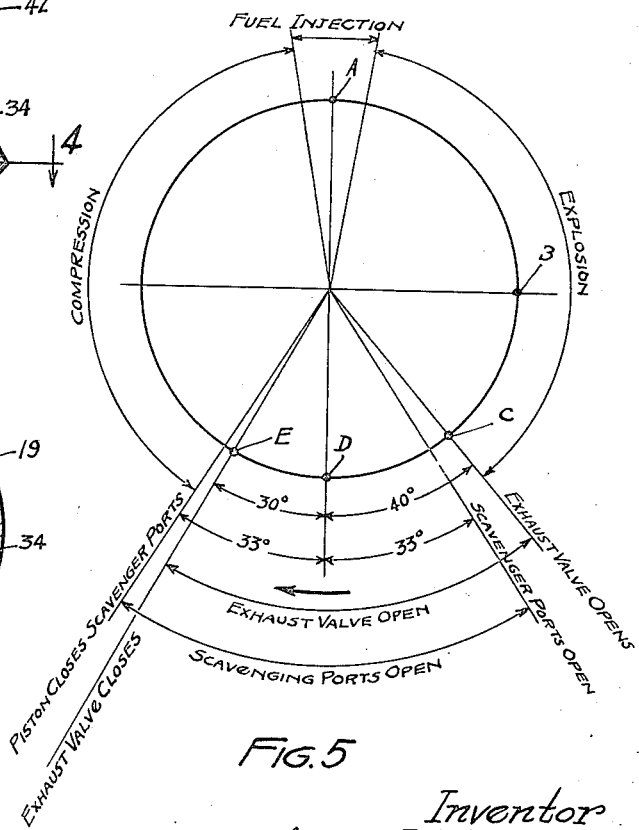
Figure 5 is a view diagrammatically illustrating a complete cycle of operation of the engine.

In the operation of an internal combustion engine of the two-cycle type equipped with a valve and valve-operating means such as herein disclosed, when the piston commences its downward stroke from the dotted line position indicated at A in Figure 1, and reaches the full line position shown at B, the cam roller 62 will be positioned at *b* on the cam surface. As the piston continues downwardly and reaches the dotted line position indicated at C in Figure 1, the cam roller will be positioned upon the periphery of the cam at the point indicated at *c*. During such movement of the cam, the lost motion or slack between the members 54 and 57 of the valve stem will be taken up so that as the cam roller travels from point *c* to point *d* on the cam, the exhaust valve will be moved to maximum opening as will be clearly understood by reference to Figure 1 and the diagram illustrated in Figure 5. When the roller is at *d* on the cam, the piston will be in its lowermost position, indicated by the dotted line D in Figure 1. From point *d* to point *e* on the cam, the valve stem will be actuated to permit the exhaust valve to move into closing position, and during the balance of the cycle of operation, the piston will return to its uppermost position A.

When the piston reaches the proper position on its up stroke (determined by the proper timing of the cycle), a fuel pump, not shown in the drawings, is actuated and forces fuel oil at high pressure through the fuel supply pipe 52 and down through the stationary pipe 48 to the fuel nozzle within the exhaust valve stem. The pressure of the fuel oil delivered into the valve stem will cause the check valve 44 to open against the action of the spring 45, thereby permitting the oil to pass through said valve and into the lower portion of the fuel nozzle, from whence it is discharged into the combustion chamber by means of the spiral grooves provided in the check valve stem, and the orifice 47 provided at the lower end of the fuel supply nozzle.

Upon the down stroke of the piston and immediately following the opening of the exhaust valve, the upper face or end of the piston passes below the tangential scavenging ports 6, whereby they are opened to permit an inrush of fresh air into the cylinder which is forced upwardly through the combustion chamber of the cylinder, thereby purging the cylinder of the burnt gases which are delivered into the exhaust chamber 64, from whence they are discharged through the usual exhaust pipe 65, shown in Figure 1. Just before the scavenging ports are closed, upon the up stroke of the piston, the exhaust valve is closed by the action of the cam 63 whereby the fresh air entrapped within the combustion chamber of the cylinder will be compressed therein. When the fuel is injected into the cylinder by the action of the high pressure fuel supply means, the fuel is sprayed into the upper portion of the cylinder against the pressure of the air confined therein through the radial ducts 33 in the valve head, thereby causing the fuel oil to become thoroughly mixed with the air before ignition occurs.

The chamber 32 provided in the member 28 in the valve head is preferably used as a precombustion chamber, but in some cases, it may be found desirable to use it merely as a means to assist in uniformly distributing the fuel through the radial ports 33 of the valve head. When used as a fuel distributing means, precombustion will not take place in the chamber 32, and atomization of the fuel will be accomplished by oil pressure.

By directing the cooling fluid downwardly through the valve stem at one side thereof, thence through the circulating chamber 34 surrounding the precombustion chamber, and up the other side of the valve stem to the outlet 15 of the circulating system, as hereinbefore described, the valve head and its stem will be cooled sufficiently to assure efficient operation of the engine. It is to be understood that I do not wish to confine myself to the exact mechanical constructions shown in the drawings, as various changes and modifications may be made without departing from the scope of the invention. The particular construction of the lost motion device of the valve stem may also be varied in numerous ways without departing from the scope of the invention.

I claim as my invention:

1. In an internal combustion engine, a power cylinder having a port, a valve for said port comprising an enlarged head and a tubular valve stem, a guide for said valve stem having fluid circulating passages therein a fuel injection nozzle in said stem, means for delivering a fuel to said nozzle, said valve head having a pre-combustion chamber therein adapted to receive fuel from said nozzle, said head also having a plurality of angularly disposed ducts therein establishing communication between the precombustion chamber and the interior of the cylinder, and fluid circulating passages in said stem and head communicating with the fluid passages in said guide whereby the cooling fluid of the engine may be circulated therethrough.

2. In an internal combustion engine, a power cylinder having a port, a valve for said port comprising an enlarged head and a tubular stem, said head being provided with a convexed face extending into the cylinder, and said head having a chamber therein connected with a fuel supply and also having a plurality of angularly disposed ducts establishing communication between said chamber and the interior of the cylinder, whereby the fuel delivered to said chamber is uniformly distributed into the combustion chamber of the cylinder, and means within said valve head and said stem whereby the cooling fluid of the engine may be circulated therethrough.

3. In an internal combustion engine, a power cylinder having a port, a valve for said port comprising an enlarged head and a tubular valve stem, a guide for said valve stem having fluid circulating passages therein a fuel injection nozzle fixedly mounted in said stem and communicating with a chamber in the valve head, a fuel supply pipe having a telescopic connection with the upper end of the valve stem and adapted to deliver fuel to said nozzle, and said valve stem and head having fluid-circulating passages therein adapted to register with the passages in said guide whereby a cooling medium may be circulated therethrough.

4. In an internal combustion engine, a power cylinder having a fluid circulating chamber therein and a port, a valve for said port comprising a head and a tubular stem, said valve head having a fluid circulating passage therein, a guide for the valve, a fuel injection nozzle in said stem communicating with a chamber in the valve head, means at the opposite end of the valve stem for supplying a fuel to said nozzle, said stem having fluid-circulating passages extending lengthwise thereof and establishing communication between the fluid-circulating chambers in said head and said power cylinder, and means in the valve stem for causing the cooling fluid to flow in a direction lengthwise thereof.

5. In an internal combustion engine a power cylinder having a port, a valve for said port having an enlarged head portion and a hollow stem, a precombustion chamber removably mounted in said head, means including a tubular member rigidly secured in said valve for delivering fuel to said chamber, and means for circulating a cooling medium in said valve around said first named means and said chamber.

6. In an internal combustion engine a power cylinder having a port, a valve for said port having an enlarged head and a hollow stem, means carried by said valve for delivering fuel therethrough into said power cylinder, and means for circulating a cooling medium in said valve around said fuel delivery means.

7. In an internal combustion engine a power cylinder having a port, a valve for said port having an enlarged head and a tubular stem, a fuel injection nozzle in said stem movable therewith, means for delivering fuel to said nozzle, the latter being in communication with said power cylinder, and means for circulating a cooling medium in said valve around said fuel delivery means.

8. In an internal combustion engine a power cylinder, a head for said cylinder having a port, a valve for said port, means rigidly mounted within said valve for introducing fuel into said cylinder, and means for circulating a cooling medium in said valve.

9. In an internal combustion engine a cylinder, a head secured to one end thereof and provided with a valve guide and a port, a valve for said port comprising a hollow head and stem, said valve stem being supported in said guide, a tubular member demountably secured in said valve stem, a precombustion chamber demountably secured in the head of said valve and having direct communication with said tubular member and cylinder, a fuel injection nozzle in said tubular member, and means for supplying fuel to said nozzle.

10. In an internal combustion engine, a power cylinder, a cylinder head therefor having a valve guide and a port, a valve for said port comprising a hollow head and stem, said valve stem being operable in said guide, a precombustion chamber in said valve head, means within said valve for conducting a fuel to said chamber, valve means in said last named means adapted to be opened by fluid pressure of the feul, yielding means within said valve stem for normally holding said last named valve in closed position, and means for circulating a cooling medium in a chamber constituted by the inner wall of said first named valve and the outer wall of said fuel conducting means and precombustion chamber.

11. In an internal combustion engine, a power cylinder, a cylinder head therefor having a port and a valve guide, a valve for said port comprising a hollow head and stem, the latter being operable in said guide, means including a tubular member in said valve for conducting a fuel to said power cylinder, a valve within said tubular member for controlling the passage of fuel therethrough adapted to be moved to open position by fluid pressure of the fuel, yielding means within said tubular member normally holding said last named valve in closed position, an atomizing nozzle interposed between said last named valve and said power cylinder, and means for circulating a cooling medium within a chamber formed by said stem and said tubular member.

12. In an internal combustion engine, a power cylinder, a cylinder head therefor having a port therein, a valve for said port having an enlarged head portion and a hollow stem, means including a tubular member rigidly secured within said valve forming an annular cooling chamber in said valve head and stem and being adapted to conduct fuel to said power cylinder, means for circulating a cooling medium in said chamber, and means for introducing fuel into said tubular member.

13. In an internal combustion engine, a power cylinder, a cylinder head therefor having a port therein, a valve for said port having an enlarged head portion and a hollow stem, means including a tubular member rigidly secured within said valve forming an annular cooling chamber in said valve head and stem and being adapted to conduct fuel to said power cylinder, means for circulating a cooling medium in said chamber, means for introducing fuel into said tubular member, and valve means in the latter adapted to be temporarily unseated by fluid pressure of said fuel.

ALLAN R. WURTELE.